Dec. 29, 1936.  J. REICHEL  2,066,302
LYOPHILIC BIOLOGICALLY ACTIVE SUBSTANCES AND PROCESS OF PRODUCING THE SAME
Filed Jan. 13, 1934
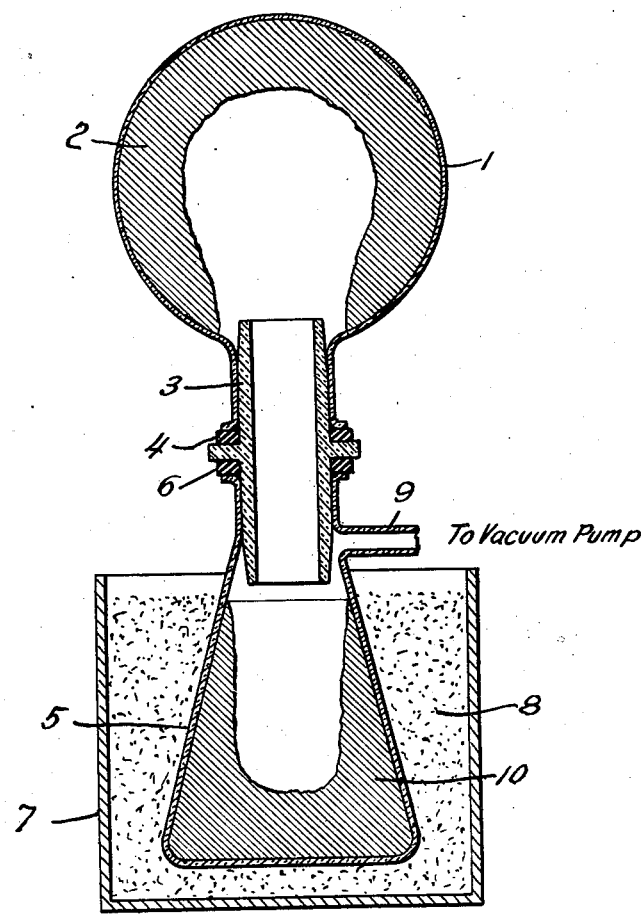
John Reichel  INVENTOR
BY Pennie Davis Marvin Edmonds
ATTORNEYS Patented Dec. 29, 1936

2,066,302

UNITED STATES PATENT OFFICE 2,066,302

LYOPHILIC BIOLOGICALLY ACTIVE SUBSTANCES, AND PROCESS OF PRODUCING THE SAME

John Reichel, Philadelphia, Pa., assignor to Sharp & Dohme, Incorporated, Philadelphia, Pa., a corporation of Maryland (1929)

Application January 13, 1934, Serial No. 706,547

REISSUED

11 Claims. (Cl. 99—199)

This invention relates to new lyophilic biologically active substances, and includes both the new substances and products and a method of producing them. More particularly the invention relates to new lyophilic sera and other biologically active substances which are prepared in the lyophilic state by the removal of water therefrom so that the lyophilic product, on being restored to the liquid state by the addition of water, will correspond closely in biological or therapeutic activities with the sera or other products in a fresh state.

Substances known as biological products, being biologically active or possessing immunizing or therapeutic value, such as sera, are used in the diagnosis, prevention and treatment of diseases of man and animals. In the form in which they are generally available at the present time they are unstable and deteriorate under the influence of physical and chemical agencies such as heat, preservatives, enzyme action, oxidation-reduction phenomena, hydrolysis, and other intramolecular changes.

Since the potency efficiency or biological activity of the substance is effected by such changes, and since such changes take place more readily in the presence of water, that is, when the colloids are dispersed in water, attempts have been made in the past, especially in the case of sera, to prevent such changes or deterioration by evaporating or removing the water from the substances at temperatures near and above the freezing point of water; but the dessication of such substances near and above the freezing point of water, that is, drying from the liquid or partial liquid state, has not given the desired results.

In the case of sera, the removal of the water by these methods brings factors into play such as formation of surface skins and gradual concentration of inorganic salts which alter the physical and chemical properties of the substances as is evidenced by their incomplete and slow solubility in water, in the formation of particles possessing a hard, granular, gritty structure with a relatively high density and marked yellow color, and in the denaturation of the proteins. Such processed sera and other substances are not completely restored by the addition of water and the rate of the partial restoration is slow compared with lyophilic substances as processed and herein described.

Furthermore, since the biological or therapeutic activity of complex substances such as sera is extremely susceptible to physical and chemical changes, experience has shown that substances dehydrated from the liquid or partially liquid state, fail to conserve all of the original biological or therapeutic activities.

The present invention overcomes the objections to prior products, such as those above referred to and provides new and valuable biological substances and products in a lyophilic state, which, on being restored by the addition of water to the lyophilic products possess the same or practically the same biological and therapeutic activities originally possessed by the substance in the so-called fresh state. The new lyophilic products, when properly produced, and protected from deterioration, will be practically identical with the original fresh material both physically and biologically.

According to the present invention, the serum or other biological product is transformed from the liquid to the completely frozen solid state by substantially instantaneous freezing of the liquid by indirect contact with a freezing agent such as liquid air, dry ice (solidified carbon dioxide) or other low temperature refrigerant or freezing mixture, and by subliming the ice from the frozen mixture while preventing melting thereof, while maintaining a high vacuum, the frozen water being removed from the frozen material without melting or softening the material.

The substantially instantaneous freezing of the serum or other liquid biologically active product is advantageously carried out by placing the liquid material in a container, such as a spherical glass flask or metal cylinder and then freezing the material quickly, solidly and completely on the inside of the container, preferably in the form of a thin layer on the inner surface of the container, by immersing the container in a freezing mixture at a temperature far below the freezing point of the material or by spraying the charged container with the cooling substance, using such cooling substances as liquid air, dry ice, or other freezing mixture at a temperature far below the freezing point of the material.

In order to insure quick and substantially instantaneous and complete freezing it may be necessary or desirable to add the liquid material to the chamber or container by installments and to allow the material to freeze solidly in the form of layers on the inside of the chamber. When a layer of the material is thus frozen in a substantially instantaneous manner to a temperature far below the freezing point, the addition of a further amount of the material will result in its substantially instantaneous freezing by coming in contact with the already frozen layer of material at such a low temperature, and by the further cooling action of the liquid air or other refrigerant in contact with the outside of the container.

When the chamber or container has become charged to the desired extent with the completely and solidly frozen serum, etc., which is frozen in a substantially instantaneous manner, the charged chamber or container is then connected to a condenser which is packed in or embedded in a freezing mixture at a sufficiently low temperature and which is also connected with a high vacuum pump, and the air is exhausted and a high vacuum maintained to effect sublimation or removal of the ice from the material in the chamber or container at a temperature below that at which the material melts or becomes liquid. The condenser may, for example, be covered or packed with or embedded in a freezing mixture such as dry ice, or a mixture of acetone and dry ice, or liquid air. The vacuum employed is as nearly a perfect vacuum as is readily obtainable with a high vacuum or super-vacuum pump. When the vacuum becomes sufficiently high, water vapor leaves the frozen charge, without melting the charge, and is collected in the form of ice in the condenser. In order to increase the rate of evaporation of the water in the frozen material, where this material is at too low a temperature, the charged chamber may be warmed with warm circulating air or by immersing it in a warm liquid, but the heat applied should not be sufficient to melt or even soften the frozen charge.

By maintaining a sufficiently high vacuum, and by regulated warming of the outside of the container of the solid frozen material to a temperature which still maintains the frozen material solid and without melting or softening, the ice contained in the frozen material is sublimed and removed without converting the frozen material into a liquid state and there remains, after the removal of the ice a dry product which has been freed from its frozen water while in a completely frozen state. When the frozen water has been completely or almost completely evaporated from the material, the charged chamber and its contents take on the temperature of the surrounding atmosphere, but prior to that time the charged chamber and its contents are at a temperature sufficiently below the freezing point to maintain the product in a solid frozen state while the ice is being removed by sublimation therefrom.

As a result of this treatment of the serum or similar biological product there are avoided or prevented any apparent physical or biological changes in the substance which is instantaneously frozen and lyophilized while maintained in its frozen state, and as a result there is obtained a final product which has not been deteriorated by treatment in a liquid state while the water is being removed therefrom. By transforming the liquid substance quickly and completely into a frozen solid state, the component parts of the colloidal system are permanently fixed and changes are prevented in the chemical equilibrium such as would occur at the surface in the dehydration of a liquid product, and such as frequently results in the formation of polymers or anhydrides of the protein or other constituents. It is well known that when such surface films occur, in the evaporation of aqueous materials such as sera, they possess different properties from the rest of the proteins as is shown by their marked insolubility.

The removal of the frozen water from the solid frozen material does not result in contraction of the volume of the material such as occurs when water is removed from liquid materials. As a result, the lyophilic material, after the removal of the frozen water therefrom, retains the same or practically the same volume as the frozen solid before the removal of the ice therefrom.

The rapid freezing of the serum or similar material and the removal of the frozen water from the frozen solid material leaves the organic residue of the material in a porous and sponge-like condition, with the structure of the colloidal particles apparently unchanged. The sponge-like network of fine particles forming the lyophilic material is apparently interspersed with a relatively immense network of minute capillary pores or passages from which the frozen water has been removed by sublimation, without apparently otherwise affecting the organic material in any objectionable way. When this material is added to water, or when water is added to it, the water readily and rapidly penetrates the material and reconverts it into a condition similar to that of the fresh serum or other liquid biological products before treatment. The material is also restored with substantial completeness to its original state or to a state similar to its original state without the presence of insoluble products such as are present in evaporated liquid sera, etc.

The lyophilic material is characterized by a light, porous texture. The end product is very friable and on the application of even a slight pressure it can be rubbed into a fine light-colored powder. As a result of this peculiar structure the density of the product is very low. In the case of sera products the material may have a density of about 0.13 in an unpulverized state and a density of about 0.25 after reducing to a powder. Under the microscope the pieces present a capillary, net-like structure. These characteristics impart to the products marked lyophilic properties.

The new lyophilic substances of the present invention may be brought back to a state similar to their original state by the addition of water equal in amount to that removed by the removal of water therefrom; or, where a more concentrated product is desired, by the addition of a lesser amount of water than that removed.

The new lyophilic biological substances retain their activity and value in a practically unaltered state for longer periods of time, and are less susceptible to changes due to heat and preservatives, than the original liquid preparations. The new materials, when properly prepared, will first float on the surface of water and then promptly dissolve and disappear, restoring a condition similar to that of the original serum or other material before treatment, being thus distinguished from substances dried or dehydrated in a liquid state and which usually pass down beneath the surface of the water and some of which remain intact for varying periods of time.

The present invention is applicable to the treatment of sera of various kinds, including normal, immune, or antitoxic sera, and other biological substances of similar nature used in the diagnosis and prevention or treatment of diseases of man or animals, and enables such materials to be converted into lyophilic products having important advantages in their increased stability to the effect of time, temperature and preservatives, and in their capability of being reconverted into liquid products similar to the fresh sera, etc. before treatment. Among the substances which can thus be treated and specific lyophilic products obtained are sera of various kinds, for example, normal horse serum, antitoxins such as scarlet fever, tetanus and diphtheria antitoxins, antivenin and other sera, etc.

An apparatus suitable for carrying out the present process and for producing the new lyophilic biologically active substances is illustrated in the accompanying drawing, and the practice of the process and the production of the new products will be further described in connection therewith, as an illustrative example. The drawing shows part of the apparatus in vertical section.

In the accompanying drawing the container for the liquid material is shown at 1 as a glass flask adapted to withstand the application of a high vacuum, and the material 2 is shown in a solid state contained in this receptacle. The container 1 is supported on the member 3 with a rubber gasket or other packing 4 to insure a tight seal. The member 3 is in turn supported on the container 5 which serves as a condenser, this condenser being similarly provided with a rubber gasket or packing 6 to insure a tight seal. The condenser 5 is shown as surrounded by a refrigerant 8 contained in a tub or container 7. The refrigerant may be a freezing mixture such as dry ice, dry ice and acetone, liquid air, etc.

The condenser is connected thru a connection 9 with a vacuum pump (not shown), this vacuum pump being a high vacuum pump or a supervacuum pump which maintains as nearly perfect a vacuum as possible.

The container 1 may vary in size from a small flask or container to a large flask or container, for example, from a container of 1 cubic centimeter or smaller capacity to a container of as much as 50 liters capacity or greater.

In the carrying out of the process a small amount of the serum or other material may be placed in the container 1 and this container then immersed in liquid air or other refrigerant which will bring about rapid and substantially instantaneous freezing of the material and reduction of its temperature far below its freezing point. The addition of further amounts of the liquid material combined with further refrigeration will result in the forming of successive layers of rapidly frozen material until a proper charge of frozen material is contained therein. The material 2 is shown as forming a thick layer on the walls of the container such as results where successive amounts of liquid are added and the container rotated so that successive layers of the material are frozen. In a flask of 50 liters capacity the charge may be, for example, thirty liters of material which is thus frozen to a solid state in the manner above described. In a flask of 20 inches diameter the layer of frozen material may be for example about 4 inches in thickness on the inside wall of the container.

When the container has thus been charged with the frozen material, which is frozen to a temperature far below the normal freezing temperature, it is connected with the condenser and the air is exhausted and a high vacuum applied. When the vacuum becomes sufficiently high water vapor leaves the frozen charge, without melting or softening of the charge and is collected in the form of a layer of ice 10 on the walls of the condenser. The rate of evaporation of the ice from the frozen material may be increased by warming the container, where it is at too low a temperature, by circulating warm air over it or by immersing it in a warm liquid, but the heat applied should never be sufficient to melt or even soften the frozen charge. The material is maintained in a solid frozen state and at a low temperature until the ice has been evaporated or sublimed therefrom when the container and its charge gradually takes on the temperature of its surroundings, this continuation of the application of the high vacuum until the substance attains a temperature substantially above 0° C. having the important advantage of promoting the removal of residual water still present in the product after the ice has been sublimed therefrom and giving a final product of improved stability, keeping properties and resistance to deterioration.

I have found it important to maintain a large and free opening or communication between the container of the frozen material and the condenser to permit the ready passage of the water vapor to the condenser. If the passage is restricted and free flow of water vapor retarded there is danger of partial or complete melting of the frozen charge, and this should be avoided.

The rapid freezing of the serum or other material retains the structure of the colloid particles and constituents and prevents change in concentration or degree of dispersion in water such as would occur in the evaporation of the materials in a liquid state. Apparently the rapid freezing of the liquid material results in a substantially complete and permanent fixing of the constituents, including colloidal constituents and inorganic salts, in the state and relative relations in which they exist in the fresh liquid material, such that, when the resulting lyophilic products are subsequently treated with fresh water they reassume practically their original state and reproduce a serum or other liquid biological product having the same or practically the same physical and biological properties as the fresh material.

It will also be noted that the material is protected, during the removal of water therefrom, while in a solid frozen state, from contact with the atmosphere, and from contact with or use of any of the known dessicating materials. The material is also protected from bacterial and mold contamination and, when treated in a sterilized condition, maintains its sterility, so that a dry, solid, lyophilic sterilized product is directly obtained.

The new lyophilic products can be kept in a lyophilic state for prolonged periods of time, for example, by sealing them in evacuated containers. The present invention therefore makes possible the preparation of products of improved keeping properties which can be stored and shipped and used when needed by the addition of a suitable amount of water thereto to reproduce a liquid product similar to the original fresh liquid serum, etc. A flask containing a mass of the lyophilic material and sealed in an evacuated state can be kept and shipped and used when desired by the addition of a suitable amount of water to reproduce the serum or other product for use. By the addition of less water than that originally removed from the fresh serum or other material a more concentrated serum, etc. can be produced. Individual doses of the lyophilic material can be packaged in sealed ampules and used as desired by the addition of the proper amount of water for an individual application of the material.

I claim:

1. As new products, lyophilic sera and other biological substances in a solid state, obtained by the rapid freezing of the liquid substances by indirect exposure to a refrigerant maintained at a temperature of about −70° C. or colder and removal of frozen water from the frozen material under a high vacuum, said substances being porous, sponge-like substances, pieces of which under the microscope present a capillary net-like structure and adapted, when water is added thereto, to form a liquid product similar to the original substance in its biological and therapeutic properties.

2. As new products, lyophilic sera and other biological substances in a porous form or in the form of a powder, said substance possessing a sponge-like or net-like structure and having marked lyophilic properties and being free from preservatives, said porous product or powder being obtained by removing the original water from the substance after freezing said substance rapidly by indirect exposure to a refrigerant maintained at a temperature of about −70° C. or colder while in a frozen state and under vacuum without having been brought in contact with or exposed to any other substance, and said substance readily reproducing a liquid, by the addition of water, having substantially the same properties as the original liquid substance.

3. The method of preparing lyophilic, biologically active substances from sera, etc. which comprises rapidly freezing the liquid material to a solid frozen state by indirect exposure to a refrigerant maintained at a temperature of about −70° C. or colder and removing the water from said frozen material by the application of a vacuum thereto while maintaining the material frozen and without melting or softening thereof.

4. The process according to claim 3 in which the water is removed from the frozen material without allowing the frozen material to be exposed to or come in contact with any other substance.

5. The process of obtaining lyophilic sera and other biological substances which comprises quickly freezing such substances in a container and removing water from the resulting solidly frozen substance under a vacuum sufficient to remove water vapor from the frozen material without softening or melting thereof while exposing the container to the atmosphere or to a bath maintained at a temperature substantially above 0° C. and with refrigeration of the escaping water vapor sufficient to form ice therefrom.

6. The method of obtaining lyophilic sera and other biological substances which comprises quickly freezing the same to a solid frozen state in a container, removing water from the solid frozen material under a high vacuum, condensing the water vapor removed from the material in the form of ice and applying sufficient heat to the solid frozen material during the removal of water therefrom by exposure of the container to the atmosphere or to a bath maintained at a temperature substantially above 0° C. to hasten the evaporation of water without melting or softening the frozen material.

7. The method of obtaining lyophilic sera and other biological substances which comprises subjecting thin layers of said substances to substantially instantaneous freezing by indirect contact with refrigerants at a temperature far below the freezing point of the substance, connecting the container of the frozen substance with a condenser through a connection providing free passage of water vapor, refrigerating the condenser with a refrigerant at a temperature far below the freezing point of water and applying a high vacuum to the container and condenser while exposing the container to the atmosphere or to a bath maintained at a temperature substantially above 0° C.

8. The method of removing water from sera and other biological products which consists in quickly freezing the substance in a container, promptly connecting the container after such freezing with a condenser, exhausting air therefrom and producing and maintaining a vacuum in said container and condenser, subjecting the condenser to refrigeration with a refrigerant such as dry ice, dry ice and acetone or liquid air, maintained at a temperature far below the freezing point of water, whereby water vapors are removed from the frozen substance into the condenser and are condensed therein into ice, and continuing the process until the substance is converted into a solid lyophilic substance by the removal of water vapor from the frozen solid and until the temperature of the substance is substantially above 0° C.

9. As new products, lyophilic sera and other biological substances in a solid state, obtained by subjecting the liquid substances to rapid freezing by exposure to a refrigerant maintained at a temperature of about −70° C. or colder, and removal of water from the solid, frozen material under a high vacuum, at a rate sufficient to maintain the substance solid, while exposing its container to the atmosphere or to a bath maintained substantially above 0° C., such vacuum being applied until the substance attains a temperature substantially above 0° C., said substance having a porous, sponge-like structure, and adapted, when water is added thereto, to form a liquid product similar to the original liquid substance in physical, biological and therapeutic properties.

10. A method of preparing lyophilic, biologically active substances from sera, etc., which comprises rapidly freezing the liquid material to a solid, frozen state by exposure of a container containing the sera, etc., to a bath maintained at a temperature of about −70° C. or colder, and removing water from said material by the application of a high vacuum thereto while maintaining the material in a solid state and while exposing the container to normal atmosphere or to a bath substantially above 0° C., whereby heat is supplied to the substance to hasten the removal of water without causing it to melt, and continuing the application of a vacuum until the substance attains a temperature substantially above 0° C.

11. The method of obtaining lyophilic sera and other biological substances which comprises subjecting such substances to substantially instantaneous freezing by indirect contact with a refrigerant maintained at a temperature below the freezing point of the substance, and removing water from said material by the application of a high vacuum thereto while maintaining the material in a solid state, and continuing the application of the high vacuum until the substance attains a temperature substantially above 0° C.

JOHN REICHEL.